(12) United States Patent
Busé

(10) Patent No.: US 6,491,535 B1
(45) Date of Patent: Dec. 10, 2002

(54) ELECTRICAL DISTRIBUTION SYSTEM WITH KEYED CHANNEL ARRANGEMENT

(75) Inventor: James M. Busé, Auburn, IN (US)

(73) Assignee: Pent Assemblies, Inc., Kendallville, IN (US)

( * ) Notice: Subject to any disclaimer, the term of this patent is extended or adjusted under 35 U.S.C. 154(b) by 0 days.

(21) Appl. No.: 09/968,233

(22) Filed: Oct. 1, 2001

(51) Int. Cl.[7] .................................................. H01R 4/60
(52) U.S. Cl. ........................................ 439/215; 174/48
(58) Field of Search ................................ 439/214, 215, 439/216, 532, 209, 211, 207, 208, 210, 716, 717, 659, 120; 174/48, 49

(56) References Cited

U.S. PATENT DOCUMENTS

| | | | |
|---|---|---|---|
| 2,924,803 A | | 2/1960 | Platz ............................ 339/21 |
| 2,924,804 A | | 2/1960 | Frank et al. .................. 339/21 |
| 3,161,974 A | | 12/1964 | Blockson ..................... 40/130 |
| 3,806,858 A | * | 4/1974 | Larsile ........................ 439/216 |
| 3,821,688 A | * | 6/1974 | Larsile ........................ 439/209 |
| 4,017,137 A | * | 4/1977 | Parks .......................... 439/135 |
| 4,634,212 A | * | 1/1987 | Boundy et al. ............... 174/48 |
| 4,825,540 A | * | 5/1989 | Kelly ........................... 29/861 |
| 4,957,447 A | * | 9/1990 | Hibbert et al. .............. 439/207 |
| 5,086,194 A | * | 2/1992 | Bruinsma ...................... 174/48 |
| 5,306,164 A | | 4/1994 | Nadeau ....................... 439/115 |
| 5,336,849 A | | 8/1994 | Whitney ........................ 174/48 |
| 5,418,328 A | | 5/1995 | Nadeau .......................... 174/48 |
| 5,614,695 A | * | 3/1997 | Benito Navazo ............. 174/48 |
| 5,759,051 A | | 6/1998 | Cancellieri et al. .......... 439/118 |
| 5,831,211 A | * | 11/1998 | Gartung et al. ................ 174/48 |
| 5,861,576 A | * | 1/1999 | Langston et al. .............. 174/48 |
| 6,036,516 A | * | 3/2000 | Byrne ......................... 439/215 |
| 6,186,825 B1 | * | 2/2001 | Bogiel et al. ................ 439/532 |
| 6,329,591 B2 | * | 12/2001 | Karst et al. .................... 174/48 |
| 6,350,135 B1 | * | 2/2002 | Acklin et al. ................ 439/211 |
| 6,362,420 B1 | * | 3/2002 | Bacouelle et al. ............ 174/48 |

\* cited by examiner

*Primary Examiner*—P. Austin Bradley
*Assistant Examiner*—Ross Gushi
(74) *Attorney, Agent, or Firm*—Taylor & Aust, P.C.

(57) ABSTRACT

An electrical distribution system includes an electrical distribution harness having a generally C-shaped channel with a keying arrangement formed therein, and an electrical connector with at least one electrical terminal array within the channel. A modular electrical component includes a mating keying arrangement complimentary to the keying arrangement in the channel, and thereby only allows the modular electrical component to be insertable into the channel and coupled with a corresponding electrical terminal array in a preselected orientation.

20 Claims, 5 Drawing Sheets

ELECTRICAL DISTRIBUTION SYSTEM WITH KEYED CHANNEL ARRANGEMENT

BACKGROUND OF THE INVENTION

1. Field of the Invention

The present invention relates to electrical distribution systems used in modular office furniture, and, more particularly, to an electrical distribution system having an electrical distribution harness which couples with modular electrical components.

2. Description of the Related Art

Modular office furniture may include modular wall panel assemblies, desks, tables, etc. Modular wall panel assemblies are used to separate one work space from another, and route electrical power and data from one work station to another. A modular wall panel assembly typically includes a modular wall panel having a raceway formed at the lower end thereof. An electrical distribution system is positioned within the raceway and distributes electrical power and/or data to selected work stations. The electrical distribution system may include a plurality of electrical distribution harnesses which are respectively suspended from the bottom of the wall panels within each corresponding raceway. End connectors and/or jumper cables connect the electrical distribution harnesses together in a parallel or series manner.

Typically, each electrical distribution harness includes a center section with a housing in which a plurality of electrical conductors are disposed. The housing may be in the form of stamped metal or molded plastic. Although suitable for distributing electrical power, stamped metal housings and molded plastic housings are relatively expensive.

What is needed in the art is an electrical distribution harness for use within modular office furniture, which is simple and easy to manufacture while at the same time ensuring quick and reliable assembly for original and retrofit installations.

SUMMARY OF THE INVENTION

The present invention provides an electrical distribution system for use in a modular wall panel assembly which includes an electrical distribution harness having a generally C-shaped channel with a keying arrangement which mates with a corresponding mating keying arrangement of a modular electrical component such as an electrical receptacle.

The invention comprises, in one form thereof, an electrical distribution system including an electrical distribution harness having a generally C-shaped channel with a keying arrangement formed therein, and an electrical connector with at least one electrical terminal array within the channel. A modular electrical component includes a mating keying arrangement complimentary to the keying arrangement in the channel, and thereby only allows the modular electrical component to be insertable into the channel and coupled with a corresponding electrical terminal array in a preselected orientation.

An advantage of the present invention is that the electrical distribution harness is formed from a pair of generally C-shaped channels which may be formed by an extrusion process and coupled in a back-to-back manner.

Another advantage is that the extrusions formed in the C-shaped channels are easily coupled together using a snap-lock arrangement therebetween.

Yet another advantage is that the C-shaped channels are monolithically formed with latches which retain the modular electrical component therein.

Yet another advantage is that the pair of feet at the bottom of the legs extending from the C-shaped channels interconnect with a trough in the cover assembly.

A further advantage is that the slots in the L-shaped legs may be formed with any size and shape corresponding to the outwardly extending lugs of the modular electrical component.

BRIEF DESCRIPTION OF THE DRAWINGS

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
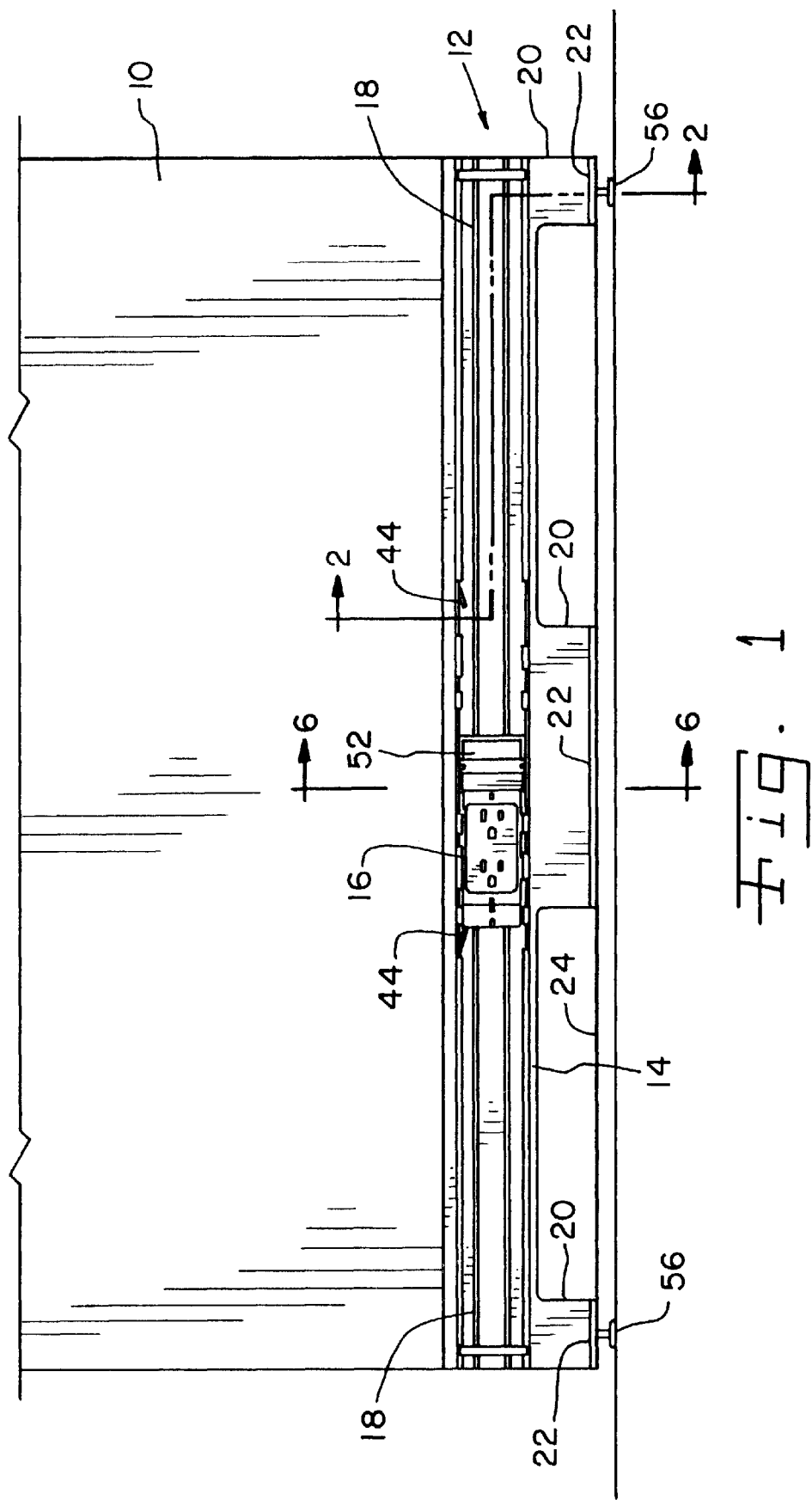
FIG. 1 is plan view illustrating a modular wall assembly including an embodiment of an electrical distribution system of the present invention.

Referring now to the drawings, and more particularly to FIG. 1, there is shown an embodiment of a modular wall panel assembly 10 including an embodiment of an electrical distribution system 12 of the present invention. Modular wall panel 10 is also referred to as modular office furniture, which may additionally include desks, tables, etc. within an office environment.

Electrical distribution system 12, shown in each of FIGS. 1–6, generally includes an electrical distribution harness 14 and one or more modular electrical components 16. In the embodiment shown in the drawings, modular electrical component 16 is in the form of an electrical receptacle, but may also be in the form of a different type of modular electrical component such as a power supply, etc. Conductors 58 (FIGS. 5 and 6) are ultimately connected at one end to a source (not shown) of electrical power or other utilities and connect electrical distribution system 12 to the source of electrical power or to other utilities by connection of the other end of conductors 58 to electrical connector 52.

Figure 2:
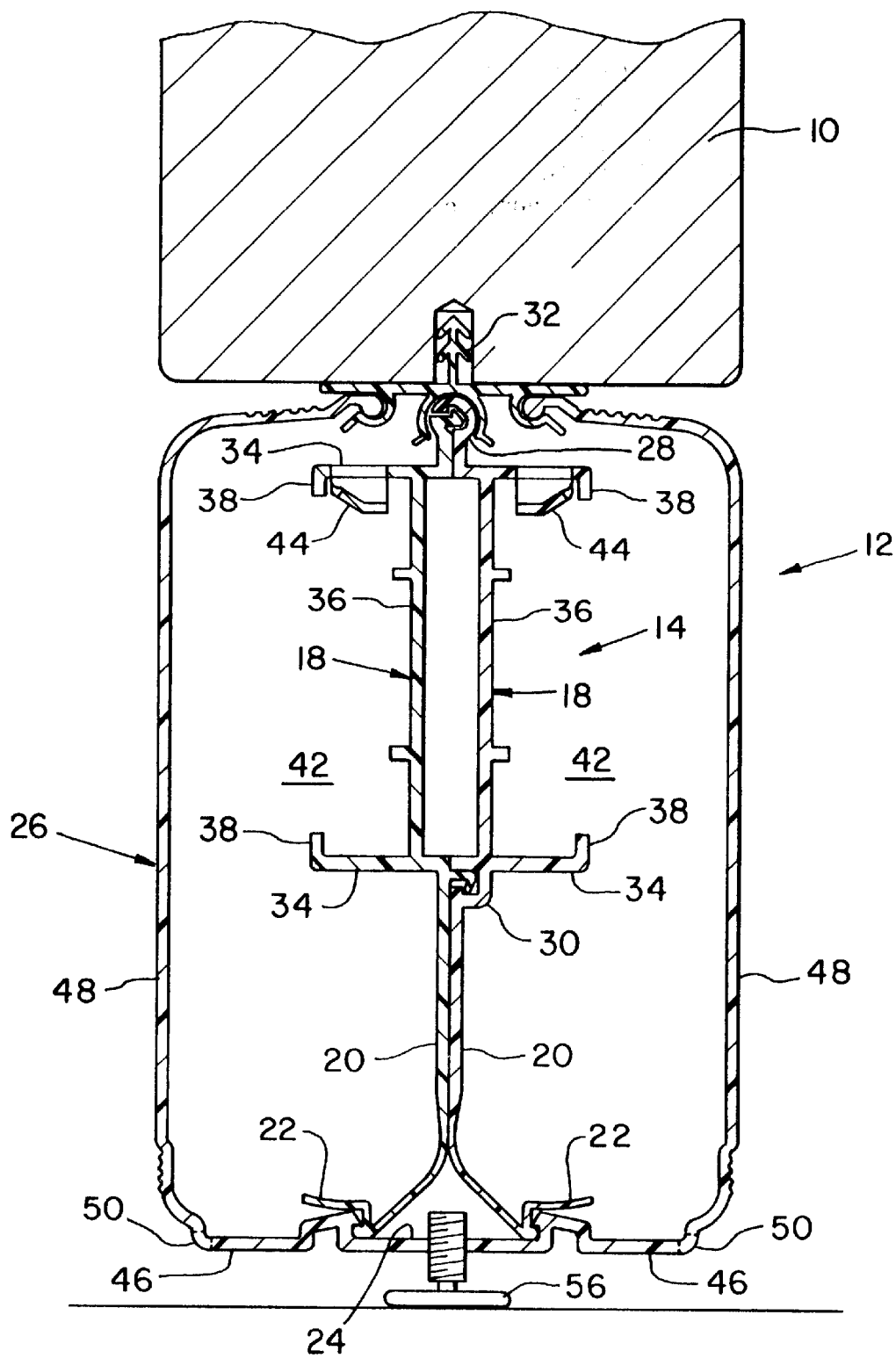
FIG. 2 is a sectional view of the electrical distribution system shown in FIG. 1 taken along line 2—2.
Figure 3:
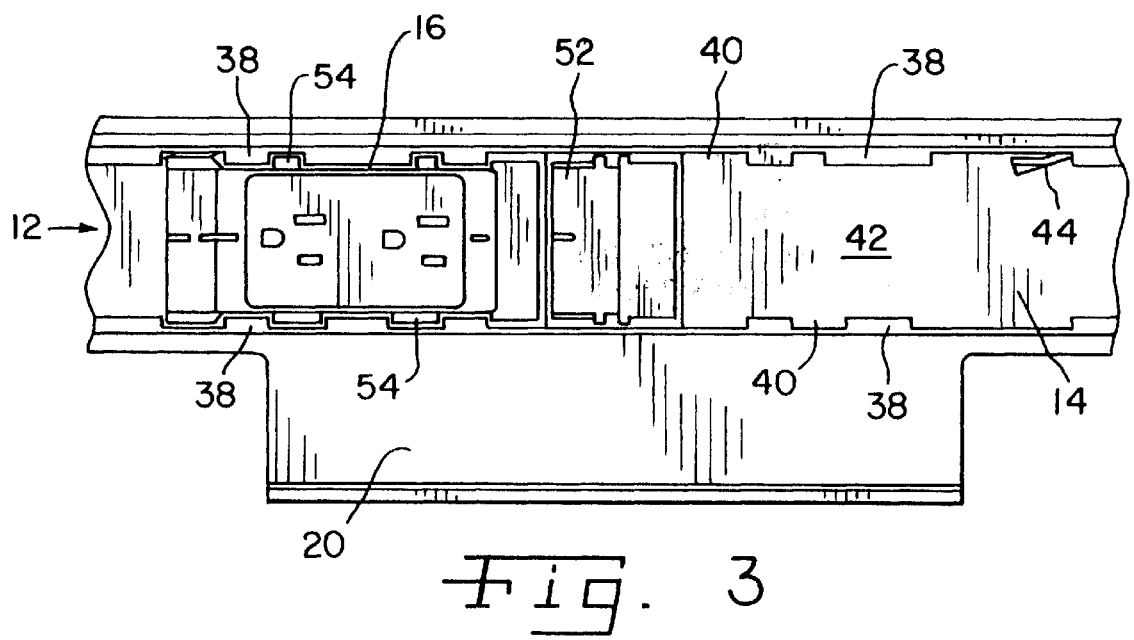
FIG. 3 is a fragmentary, plan view illustrating the modular electrical component prior to insertion within the electrical distribution harness.
Figure 4:
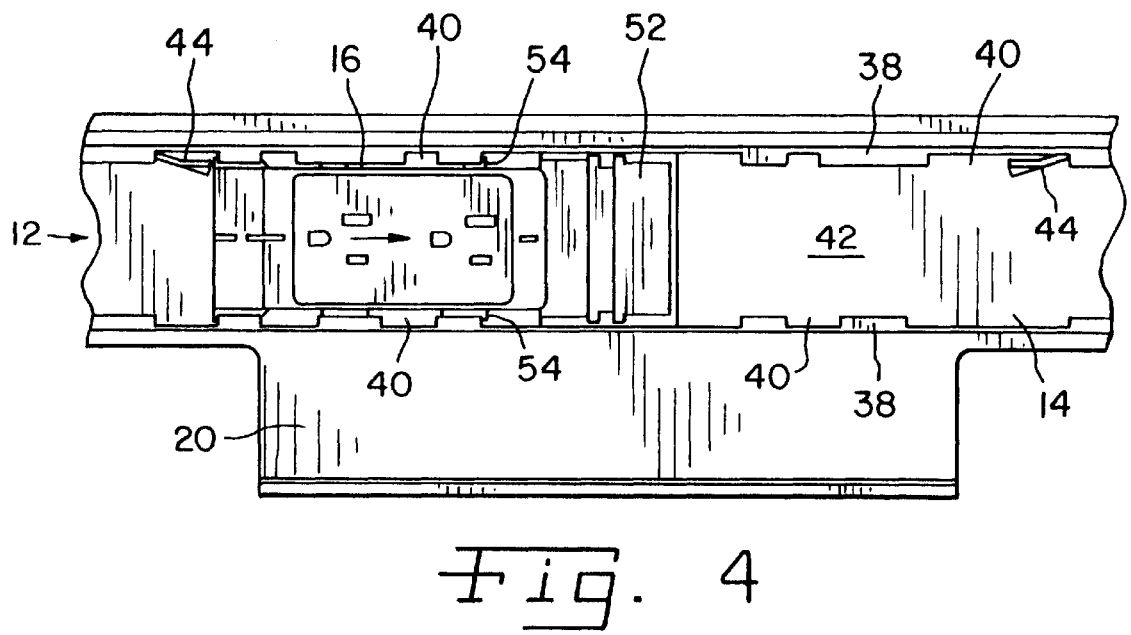
FIG. 4 is a fragmentary, plan view illustrating the modular electrical component coupled with the electrical distribution harness.
Figure 5:
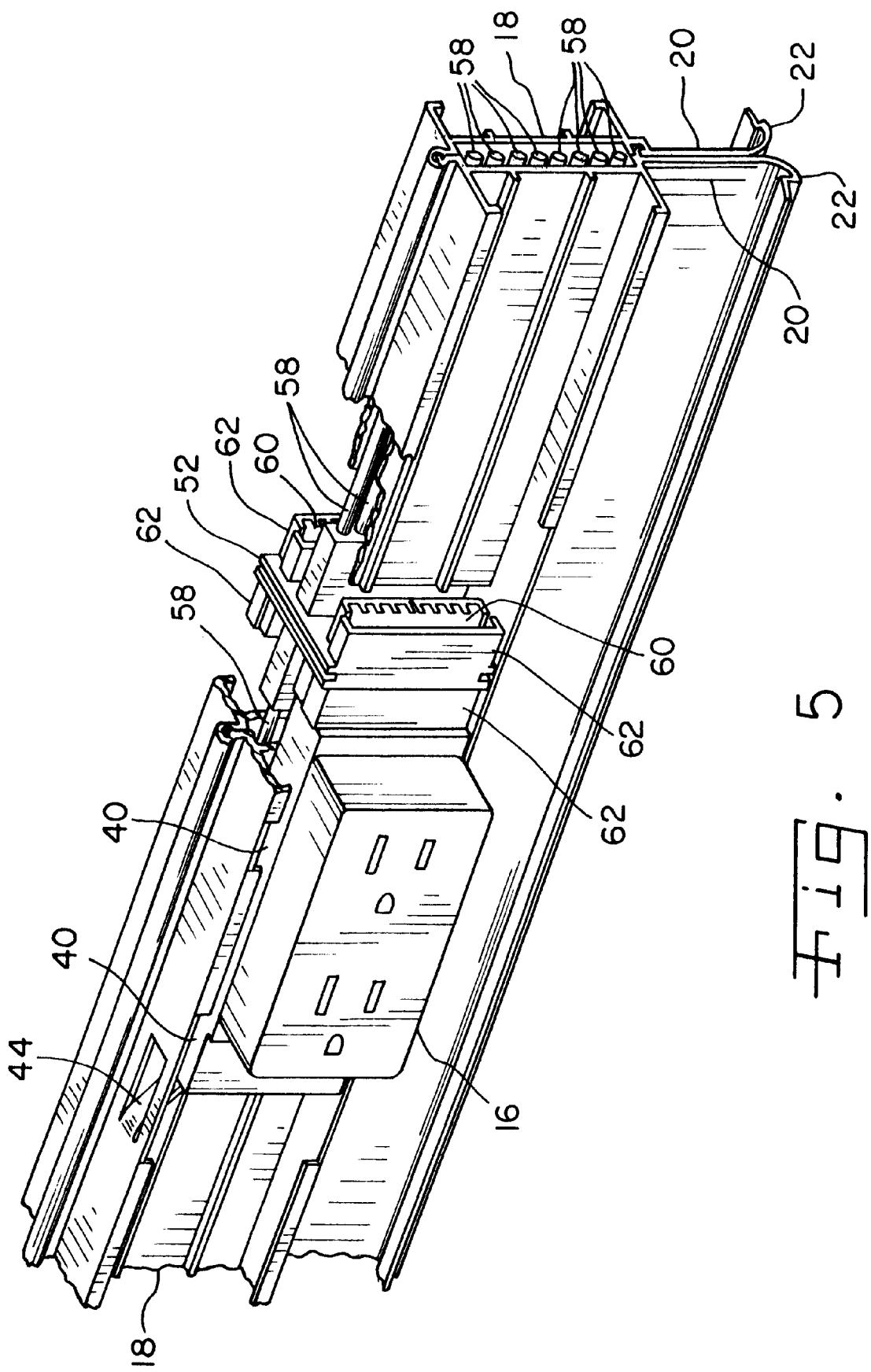
FIG. 5 is a perspective, fragmentary view of the embodiment of FIG. of the electrical distribution system of the present invention.

Electrical distribution harness 14, shown in cross section in FIG. 2, includes a pair of generally C-shaped channels 18 arranged in a back-to-back configuration. A leg 20 extends from each respective C-shaped channel 18 in a downward direction and terminates at a foot 22. Feet 22 are spaced apart relative to each other to fit within a trough 24 of one piece cover assembly 26. C-shaped channels 18 also include upper and lower snap lock arrangements 28 and 30. Upper snap lock arrangement 28 is received within a barb type fitting 32, which in turn is received within a slot formed in the lower end of modular wall panel 10.

Each C-shaped channel 18 includes a pair of opposed generally L-shaped legs 34 and an interconnecting portion 36 extending between legs 34. Each L-shaped leg 34 includes a transversely extending lip 38 with a keying arrangement in the form of a plurality of slots 40 formed therein. Lips 38 define an insertion opening 42 therebetween through which electrical receptacle 16 may be inserted into C-shaped channel 18.

Each C-shaped channel 18 also includes a resilient latch 44 which is formed monolithically therewith. Latch 44 retains electrical receptacle 16 within C-shaped channel 18. Latch 44 may also be a separate piece which is coupled with C-shaped channel 18 via direct attachment rather than monolithic forming.

Cover assembly 26 generally includes bottom plate 46 with trough 24, and with side covers 48 coupled along respective side edges of bottom plate 46 via a living hinge 50. Each side cover 48 may be pivoted in a downward direction about living hinge 50 to expose electrical distribution harness 14 contained therein.

Figure 6:
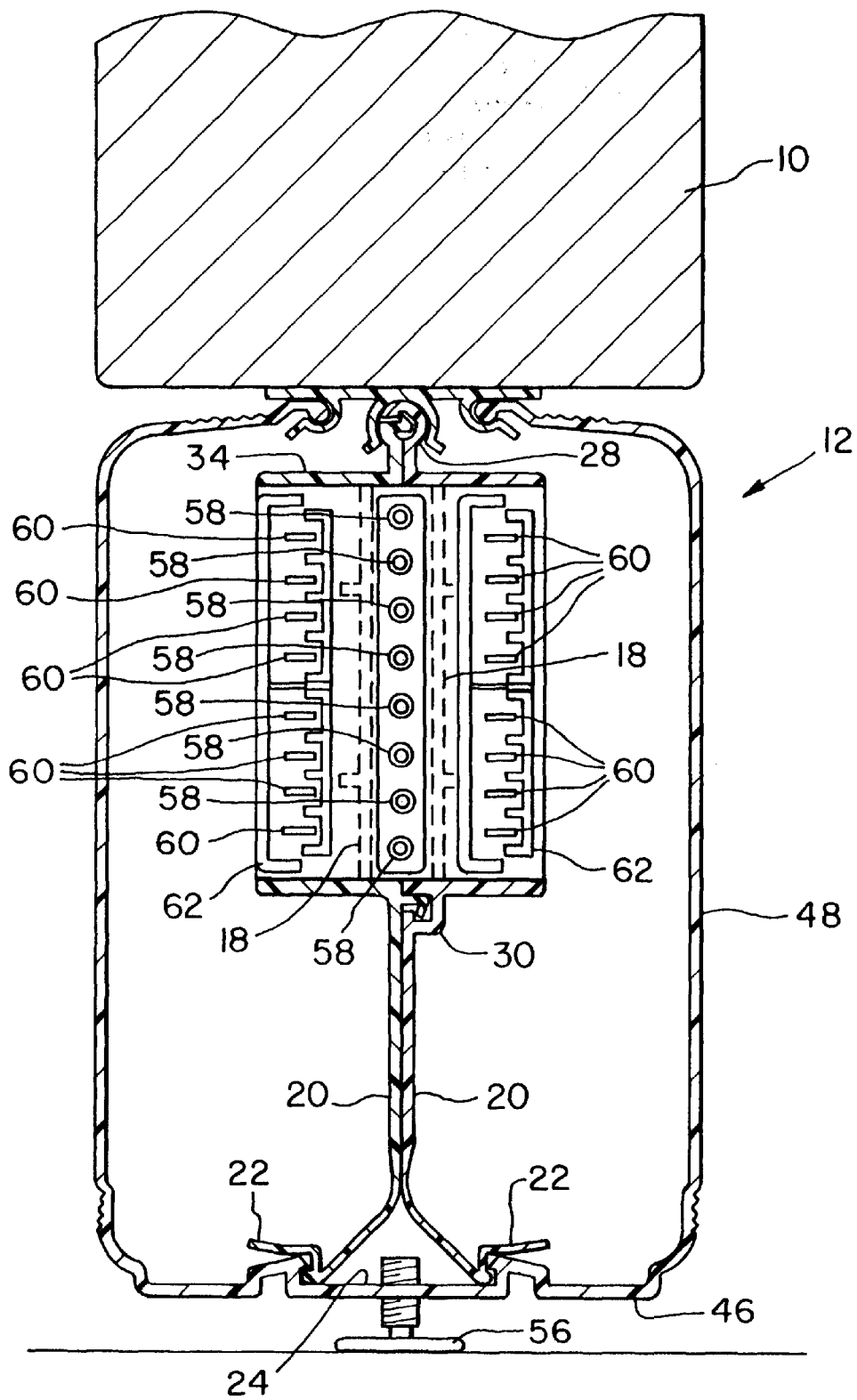
FIG. 6 is a sectional view of the electrical distribution system shown in FIG. 1 taken along line 6—6.

An electrical connector 52 includes two pairs of oppositely facing terminal ports 62, with each terminal port 62 having an electrical terminal array 60 which is positioned within a corresponding C-shaped channel 18. Electrical connector 52 extends through complimentary cutouts (not numbered) formed in each interconnecting portion 36 of the back-to-back C-shaped channels 18, such that each pair of electrical terminal arrays 60 faces in opposite directions within a corresponding C-shaped channel 18. As electrical connector 52 is positioned within C-shaped channel 18, which, as previously stated, is included in harness 14, connector 52 is therefore connected to harness 14. Because of the cross-sectional view, FIG. 6 shows only two terminal ports 62 with their corresponding electrical terminal arrays 60, however, two oppositely facing terminal ports 62 with their corresponding electrical terminal arrays 60 are directly behind the shown terminal ports 62 in FIG. 6.

Electrical receptacle 16 includes a mating keying arrangement in the form of lugs 54 on the outer side edges thereof. Each lug 54 is received within a correspondingly sized and shaped slot 40 of a C-shaped channel 18. Lugs 54 are arranged in an asymmetrical manner such that either one end or the other, but not both, of the end connectors of an electrical receptacle 16 may be engaged with the corresponding electrical terminal array 60 of electrical connector 52. In this manner, it is assured that the electrical terminals within electrical receptacle 16 are mated with proper polarity with electrical terminals within a selected electrical terminal array 60 of electrical connector 52. Of course, the exact number of lugs, as well as the sizing and shape of the lugs may vary from one application to another as long as electrical receptacle 16 can only be coupled with a corresponding electrical terminal array 60 in a preselected manner. Moreover, other types of keying arrangements between C-shaped channel 18 and electrical receptacle 16 are also possible.

During assembly, C-shaped channels 18 are fastened together by snap-locking snap lock arrangements 28 and 30 together. Feet 22 are placed within trough 24 of bottom plate 46. A vertical adjustment foot 56 is threadingly engaged within a corresponding opening (not shown) within bottom plate 46 to provide for vertical adjustment and leveling of electrical distribution system 12. Barb-type fitting 32 is coupled with upper snap lock arrangement 28, and the barb fitting is inserted into a corresponding longitudinal slot in the bottom of modular wall panel 10. One or both side covers 48 may be pivoted in a downward direction about a corresponding living hinge 50 to expose electrical distribution harness 14 therein. An electrical receptacle 16 or other suitable modular electrical component may be inserted into C-shaped channel 18 and coupled with a corresponding electrical terminal array 60 of electrical connector 52. More particularly, lugs 54 of electrical receptacle 16 are aligned with slots 40 of opposing lips 38. Lugs 54 pass through slots 40, allowing electrical receptacle 16 to be inserted into C-shaped channel 18 with a corresponding end connector being placed adjacent a selected electrical terminal array 60 of electrical connector 52. Electrical receptacle 16 is then slid in a direction toward electrical connector 52 such that the end connector thereof mates with the electrical terminal array 60 of electrical connector 52. When electrical receptacle 16 is coupled with electrical connector 52, latch 44 snaps into place at an end of electrical receptacle 16 opposite from electrical connector 52, thereby retaining electrical receptacle 16 in place within C-shaped channel 18. Electrical receptacle 16 may be mated with any of the remaining three electrical terminal arrays 60 of electrical connector 52 by orienting lugs 54 with slots 40. In this manner, electrical receptacle 16 can only be connected with a corresponding electrical terminal array 60 of electrical connector 52 in a predetermined manner insuring proper polarity.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical distribution system, comprising:
   an electrical distribution harness including a generally C-shaped channel extrusion having a keying arrangement formed therein, said C-shaped channel extrusion having a length extending from a first axial end to a second axial end, said C-shaped channel extrusion having a substantially uniform cross-section over entire said length;
   an electrical connector mounted within said channel extrusion, said electrical connector having at least one electrical terminal array; and
   a modular electrical component mounted within said channel extrusion, said modular electrical component including a mating keying arrangement complimentary to said keying arrangement in said channel extrusion and thereby only allowing said modular electrical component to be insertable into said channel extrusion and coupled with a corresponding said electrical terminal array in a preselected orientation.

2. The electrical distribution system of claim 1, wherein said C-shaped channel includes a pair of opposed generally L-shaped legs and an interconnecting portion extending between said legs, at least one said leg including said keying arrangement.

3. The electrical distribution system of claim 2, each said leg including a lip, at least one said lip including said keying arrangement, said lips defining an insertion opening therebetween through which said modular electrical component is insertable into said channel.

4. The electrical distribution system of claim 2, wherein each said leg includes said keying arrangement.

5. The electrical distribution system of claim 1, said electrical distribution harness including a second generally C-shaped channel having a keying arrangement formed therein, and an electrical connector with at least one electrical terminal array within said channel, said C-shaped channel and said second C-shaped channel arranged in a back-to-back configuration.

6. The electrical distribution system of claim 1, further including a resilient latch coupled with said C-shaped channel, said latch retaining said modular electrical component within said channel.

7. The electrical distribution system of claim 6, wherein said latch is monolithic with said C-shaped channel.

8. The electrical distribution system of claim 1, wherein said modular electrical component comprises an electrical receptacle.

9. An electrical distribution harness for use with modular office furniture, comprising a generally C-shaped channel extrusion, said C-shaped channel extrusion having a length extending from a first axial end to a second axial end, said C-shaped channel extrusion having a substantially uniform cross-section over entire said and an electrical connector mounted within said channel extrusion, said electrical connector including at least one electrical terminal array, said C-shaped channel extrusion including a pair of opposed generally L-shaped legs and an interconnecting portion extending between said legs, each said leg including a lip, at least one said lip including a keying arrangement allowing insertion of a modular electrical component into said C-shaped channel extrusion, said lips defining an insertion opening therebetween through which said modular electrical component is insertable into said channel extrusion.

10. A modular wall panel assembly, comprising:
a modular wall panel;
an electrical distribution harness positioned in association with said wall panel, said electrical distribution harness including a generally C-shaped channel extrusion, said C-shaped channel extrusion having a length extending from a first axial end to a second axial end, said C-shaped channel extrusion having a substantially uniform cross-section over entire said length, having a keying arrangement formed therein;
an electrical connector mounted within said channel extrusion, said electrical connector having at least one electrical terminal array; and
a modular electrical component mounted within said channel extrusion, said modular electrical component including a mating keying arrangement complimentary to said keying arrangement in said channel extrusion and thereby only allowing said modular electrical component to be insertable into said channel extrusion and coupled with a corresponding said electrical terminal array in a preselected orientation.

11. The modular wall panel assembly of claim 10, wherein said C-shaped channel includes a pair of opposed generally L-shaped legs and an interconnecting portion extending between said legs, at least one said leg including said keying arrangement.

12. The modular wall panel assembly of claim 11, each said leg including a lip, at least one said lip including said keying arrangement, said lips defining an insertion opening therebetween through which said modular electrical component is insertable into said channel.

13. The modular wall panel assembly of claim 11, wherein each said leg includes said keying arrangement.

14. The modular wall panel assembly of claim 10, said electrical distribution harness including a second generally C-shaped channel having a keying arrangement formed therein, and an electrical connector with at least one electrical terminal array within said channel, said C-shaped channel and said second C-shaped channel arranged in a back-to-back configuration.

15. The modular wall panel assembly of claim 10, further including a resilient latch coupled with said C-shaped channel, said latch retaining said modular electrical component within said channel.

16. The modular wall panel assembly of claim 15, wherein said latch is monolithic with said C-shaped channel.

17. The modular wall panel assembly of claim 10, wherein said modular electrical component comprises an electrical receptacle.

18. A method of distributing electrical power in modular office furniture, comprising the steps of:
providing an electrical distribution harness including a generally C-shaped channel extrusion, said C-shaped channel extrusion having a length extending from a first axial end to a second axial end, said C-shaped channel extrusion having a substantially uniform cross-section over entire said length, having a keying arrangement formed therein;
mounting an electrical connector within said channel extrusion, said electrical connector having at least one electrical terminal array;
providing a modular electrical component including a mating keying arrangement complimentary to said keying arrangement in said channel extrusion;
inserting said modular electrical component into said channel extrusion in an orientation dependent upon said keying arrangement and said mating keying arrangement; and
coupling said modular electrical component with said electrical terminal array.

19. The method of claim 18, wherein said coupling step comprises coupling an electrical receptacle with said electrical terminal array.

20. The method of claim 18, further including the steps of coupling a resilient latch with said C-shaped channel, and retaining said modular electrical component within said channel using said latch.

* * * * *